April 4, 1939.  E. D. BARNES  2,152,755
TIRE RECAPPING PRESS
Filed Dec. 30, 1936  3 Sheets—Sheet 2

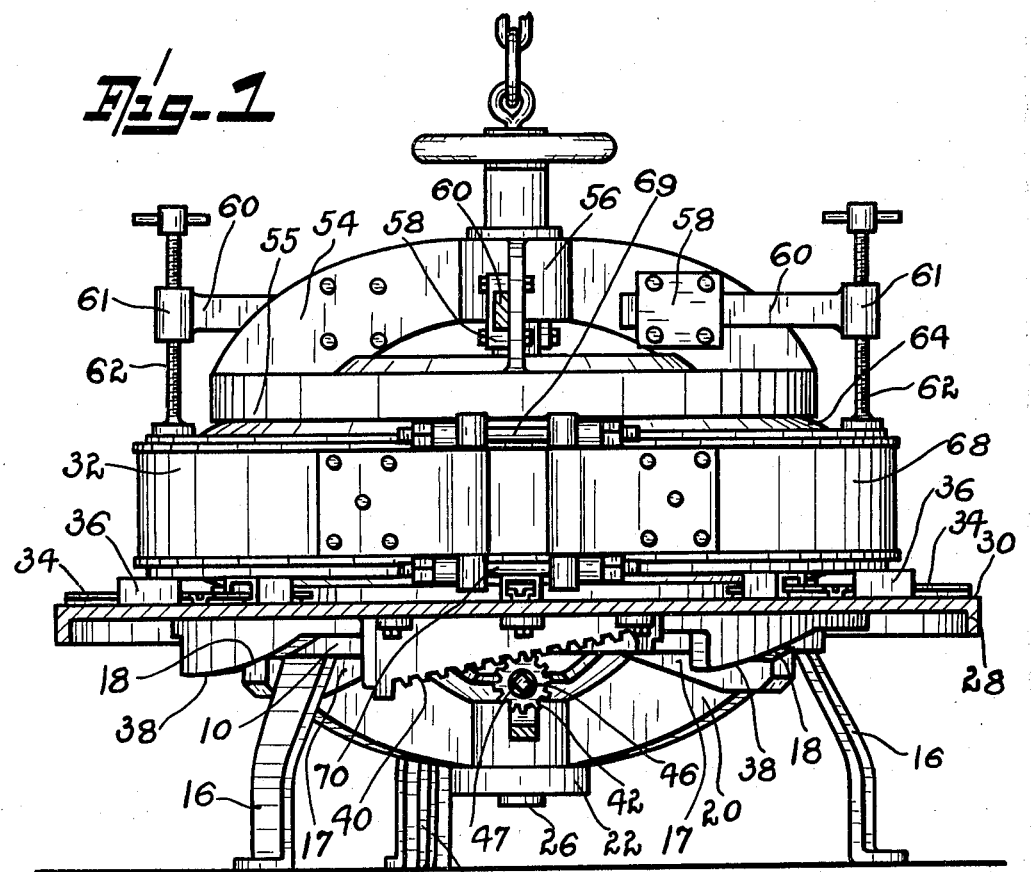
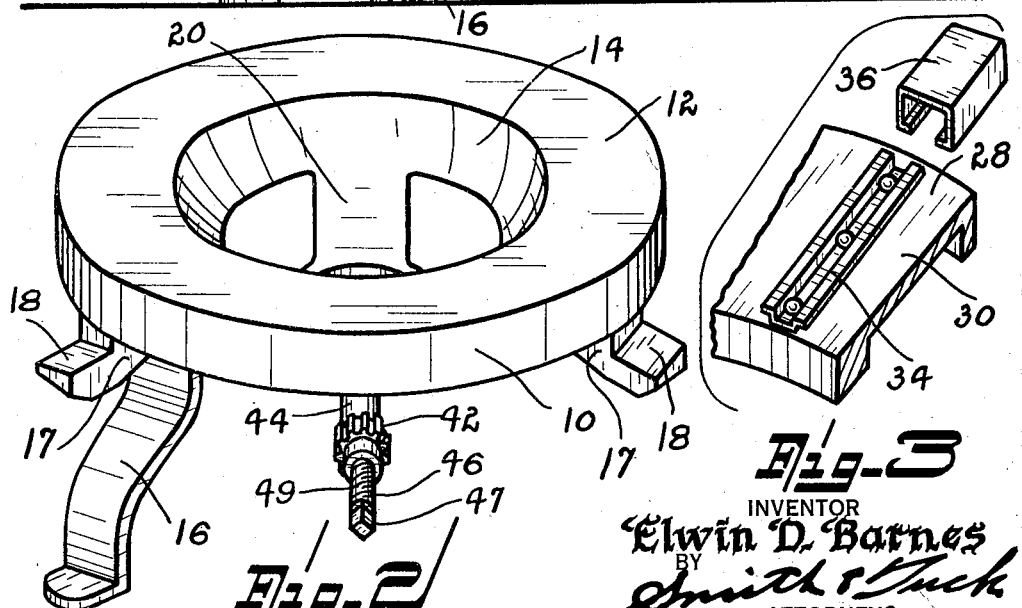

INVENTOR
Elwin D. Barnes
BY
Smith & Tuck
ATTORNEYS

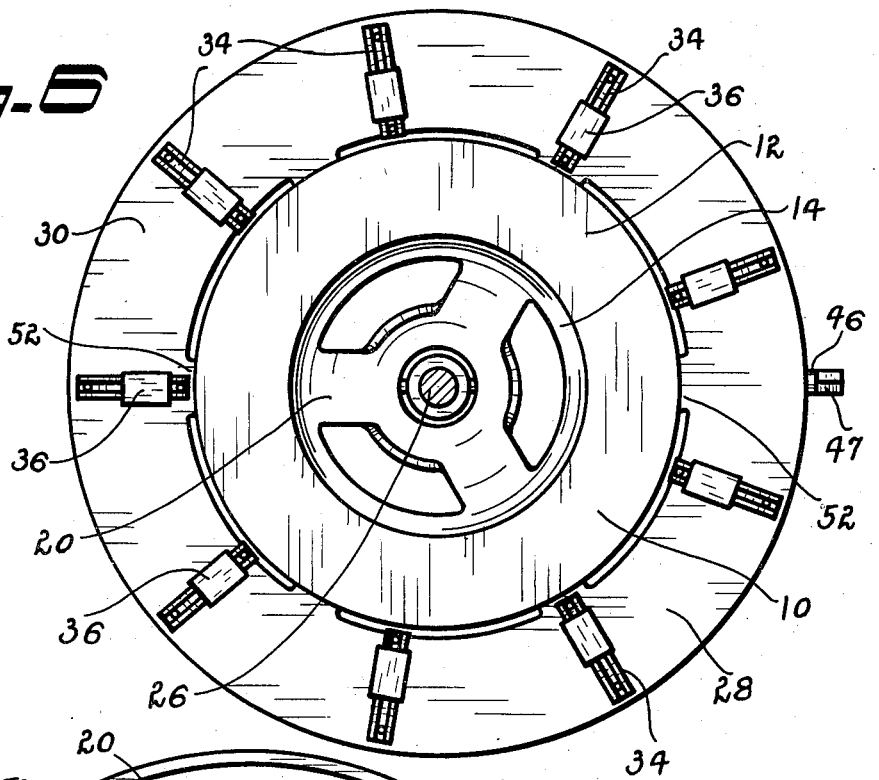

Patented Apr. 4, 1939

2,152,755

UNITED STATES PATENT OFFICE 2,152,755

TIRE RECAPPING PRESS

Elwin D. Barnes, Seattle, Wash.

Application December 30, 1936, Serial No. 118,391

10 Claims. (Cl. 18—18)

My present invention relates to the art of tire repairing equipment and more particularly to a tire recapping press.

This present application is an improvement upon the press shown in United States Patent Number 2,030,861. It differs from that equipment in certain features which make the device more easily handled, more easily and quickly set up for the tire cap curing process, and more economical to manufacture with less foundry loss in the molding operation.

In the former construction some difficulty was encountered in producing the lower table, which, being large in size and of irregular structural shape, had certain parts wherein the thickness of metal was much greater than in others; this caused unequal strain in casting with resulting occasional failures.

My new table is formed of an inner, fixed portion and an outer adjustable portion, the inner table portion supporting the lower side walls of the tire under treatment and the outer table portion supporting the tire cap mold. This equipment, providing that the lower table be made in two parts, is free from these casting strains and, further, the construction permits of a convenient and quick adjustment in height between the fixed table portion and that portion of the table forming the rest for the under side of the cap mold during the period a tire is being treated.

Other means are provided for more accurately positioning the cap mold and holding the mold at the desired height during the curing operation.

Other and more specific objects will be apparent from the following description taken in connection with the accompanying drawings, wherein Figure 1 is a side elevation of a press showing a tire and tire cap mold in position certain parts being broken away and shown in section to better illustrate the new construction thereof.

Figure 2 is a perspective view of the inner, fixed portion of my supporting table.

Figure 3 is a bracketed perspective view, showing the means employed for positioning and supporting the tire cap mold.

Figure 6 is a top plan view of my table showing the fixed and the adjustable table portion with the clamping screw shown in section.

Figure 7 is a bottom plan view of my table, partly in section, showing the fixed and movable table portion together with the means for accomplishing the adjusting of the outer ring portion.

Figure 4:
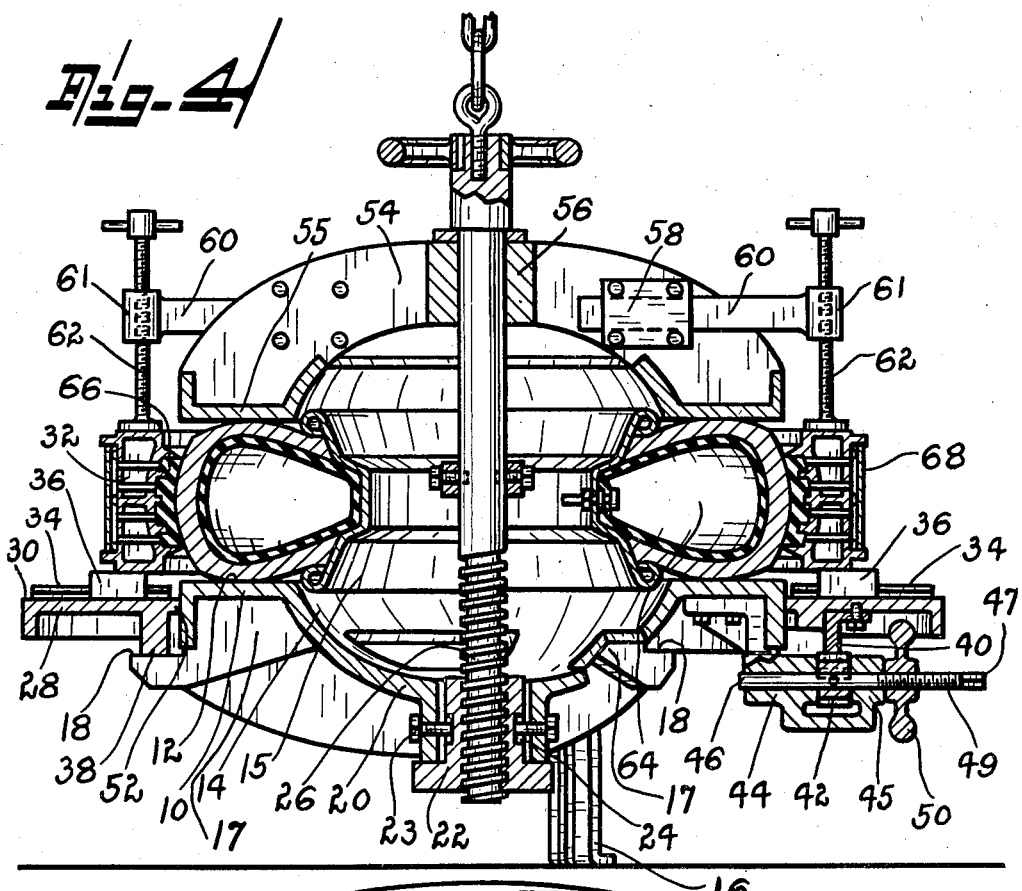
Figure 4 is a cross-sectional view, in elevation, through the center of my device as shown in Figure 1.
Figure 5:
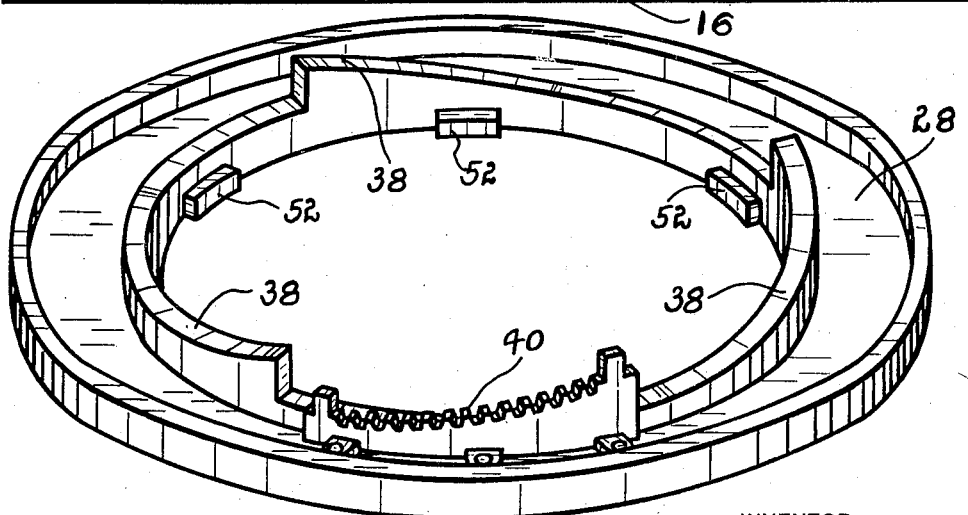
Figure 5 is a perspective view showing the bottom of my adjustable table member.

Referring to the drawings, throughout which like reference characters indicate like parts, 10 designates the central or fixed table portion of my invention. This has a flat upper surface 12 of a diameter, both inside and outside, sufficient to adequately support the range of tire sizes that the particular press is designed for. A central depression 14 is provided so that the tire rim 15 can be accommodated within this depression. A plurality of supporting legs 16 are employed to carry the weight of the entire machine. Also secured to, or formed as part of, table 10 are brackets 17 each of which is provided with a slightly beveled supporting surface 18 adapted to support the adjustable table portion. Table 10 is further provided with a central spider portion 20 which forms a seat for the clamping screw nut 22, the same being loosely supported within the spider by a plurality of screws 23 which rest in a rather wide annular groove 24. This groove is of sufficient width so that, when the nut is placed under strain by clamp screw 26, there will be no strain on screws 23.

Disposed around the central portion of table 10 is an adjustable ring table 28. This table is provided with an upper flat surface 30 of sufficient lateral extent to provide adequate support means for the tire cap mold 32. To assist in this purpose, the upper surface is provided with a plurality of radially disposed track members as 34 which form a guide and securing means for the support members 36, which members, in turn, directly support molds 32. While normal adjustments in height are made by moving table 28 up or down with respect to table 10, large changes, as might be experienced when different types of tires are used, can be effected by changing the height of members 36. Ring table 28 is supported from table 10 by a plurality of cam surfaces 38 which rest upon and are slidable on support surfaces 18. To provide a convenient means for adjusting table 28 with respect to table 10 I have provided a curved gear rack 40 which is secured to table 28 and has the same inclination as cam 38. Adapted to operatively engage rack 40 is the driving pinion 42. This pinion is supported by spaced bearings 44 and 45 which in turn are supported from table 10. Pinion 42 is fixedly secured to shaft 46, which shaft is provided at its outer end with a deformed portion 47 adapted to receive a wrench or crank 48. Shaft 46 is threaded as at 49 and has disposed therein the hand wheel 50. This hand wheel has the function of locking shaft 46 against rotation after the proper height adjustment of ring table 28 has been made.

In order to prevent undue friction and to aid in finishing the rather large mating surfaces of tables 10 and 28 I provide a plurality of bearing lugs 52 which may be ground or otherwise finished so as to provide an engagement with the periphery of table 10.

Disposed above table 10 is the upper pressure ring 54. This is provided with radially disposed arms and the bearing plate proper 55. It is provided with a bearing at 56 so as to assume the pressure applied to the upper ring by screw 26. Secured to the spider arms of member 54 are clamp plates 58 which adjustably position arms 60. These arms, in turn, form threaded guides 26, 61 for the mold positioning screws 62. These screws are provided to put downward pressure on molds 32 and hold the same in the desired position upon support members 36 for curing the tire cap. Owing to the fact that many different sizes of molds 32 may be used with one press it is necessary to have the lateral adjustment provided by arms 60 and clamp plates 58 so that the pressure screws 62 will be easily adjusted to engage the different size molds.

Method of operation

In using my present equipment the first operation is to put the tire 64, on its rim 15, in place. The upper pressure plate 54 is lowered on the tire and secured in place by adjustment of screw 26. This operation positions the camel-back tread which has previously been cemented on to the tire. Mold 32, which is made of a plurality of sections as more fully explained in United States Patent Number 2,030,861, is next put in place around the tire.

Assuming that supports 36 of the proper height are already in place, they are slid along guideways 34 so as to effectively support the mold. Table 28 is then adjusted by means of crank 48 until the mold is properly placed with respect to the camel-back tread 66. The upper positioning screws 62 are then adjusted so as to center over mold 32 and are then screwed down into firm engagement with the top of the mold thus definitely securing the same in place so that it will not tend to move when the new tread portion 66 has become softened with the application of heat in mold 32. This assures the prolonged proper position of mold 32 throughout the entire curing operation and assures a perfect tread in the finished recap. Mold 32 is then contracted by means of band 68 and tension rods 69 and 70 until the various mold sections are in secure, steam tight engagement with each other after which the steam is introduced into the mold and the curing of the cap is started.

When the cure has been completed which usually is approximately two hours, the reverse of the above operation takes place; band 68 is removed and the various sections of mold 32 are slid away from the tire and supported in their withdrawn position by sliders 36, which can then be slid outwardly along guideway 34. In this way the minimum loss of time is occasioned and uniform results assured.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. In a tire retreader the combination with a tire supporting table and an annular clamp thereon, means for compressing said clamp against a side wall of a tire, and a mold adapted to surround the periphery of said tire, of a rotatable mold supporting ring interposed between said table and said mold, and a series of cams on said ring for co-action with said table providing vertical adjustment for said mold.

2. In a tire retreader the combination with a tire supporting table having a series of bearing surfaces thereon, an annular clamp on said table, means for compressing said clamp against a side wall of a tire, and a mold adapted to surround the periphery of said tire, of a mold supporting ring interposed between said table and said mold, and a series of cams on said ring for co-action with said bearing surfaces to vertically adjust said mold.

3. In a tire retreader the combination with a tire supporting table having a series of annularly disposed bearing surfaces thereon, an annular clamp on said table, means for compressing said clamp against a side wall of a tire, and a mold adapted to surround the periphery of said tire, of a rotatable mold supporting ring interposed between said table and said mold, a series of cams on said ring for co-action with said bearing surfaces to vertically adjust said mold, and means for rotating said ring with relation to said bearing surfaces.

4. In a tire retreader the combination with a tire supporting table having an annular series of bearing surfaces thereon, an annular clamp on said table, means for compressing said clamp against a side wall of a tire, and a mold adapted to surround the periphery of said tire, of a rotatable mold supporting ring interposed between said table and said mold, a series of cams on said ring for co-action with said bearing surfaces to vertically adjust said mold, a rack mounted on said ring and a pinion mounted on said table and engaging said rack, and means for rotating said pinion.

5. In a tire retreader the combination with a tire supporting table having an annular series of bearing surfaces, an annular clamp on said table, means for compressing said clamp against a tire, and a mold adapted to surround the periphery of said tire, of a rotatable mold supporting ring interposed between said table and said mold, a series of cams on said ring for co-action with said bearing surfaces to vertically adjust said mold, means for rotating said ring with relation to said bearing surfaces, and means for retaining said ring in adjusted position.

6. In a tire retreader the combination with a tire supporting table having an annular series of bearing surfaces, an annular clamp on said table, means for compressing said clamp against a side wall of a tire, and a mold adapted to surround the periphery of the tire, of a rotatable supporting ring interposed between said table and said mold, mold-supporting members on said ring, means for adjusting said members, a series of cams on said ring for co-action with said bearing surfaces to vertically adjust said mold, means for rotating said ring with relation to said bearing surfaces, and means for retaining said ring in adjusted position.

7. In a tire retreader the combination with a tire supporting table, an annular clamp thereon, means for compressing said clamp against the side wall of a tire, and a mold adapted to surround the periphery of the tire, of a mold supporting ring interposed between said table and said mold, means on said ring providing vertical adjustment for said mold, and means for retaining said last mentioned means in adjusted position.

8. In a tire retreader the combination with a tire supporting table having an annular series of bearing surfaces, an annular clamp on said table, means for compressing said clamp against a side wall of a tire, and a mold adapted to surround the periphery of the tire, of a rotatable supporting ring interposed between said table and said mold, mold-supporting members on said ring and means providing radial adjustment for said members, a series of cams on said ring for co-action with said bearing surfaces to vertically adjust said mold, means for rotating said ring in relation to said bearing surfaces, and means for retaining said ring in adjusted position.

9. In a tire retreader the combination with a tire supporting table having an annular series of bearing surfaces, an annular clamp on said table, means for compressing said clamp against a side wall of a tire, and a mold adapted to surround the periphery of the tire, of a ring interposed between said table and said mold, mold-supporting members on said ring, means for radially adjusting said members, a series of cams on said ring for co-action with said bearing surfaces to vertically adjust said mold, a rack on said ring, a pinion on said table engaging said rack to rotate said ring, means for rotating said pinion, and means for retaining said last mentioned means in adjusted position.

10. In a tire retreader the combination with a tire supporting table having an annular series of bearing surfaces, an annular clamp on said table, means for compressing said clamp against a side wall of a tire, and a mold adapted to surround the periphery of said tire, of a ring interposed between said table and said mold, mold-supporting members on said ring, means for radially adjusting said members, a series of cams on said ring for co-action with said bearing surfaces to vertically adjust said mold, an arcuate rack on said ring, a pinion on said table in engagement with said rack, means for rotating said pinion, and means for retaining said pinion in adjusted position.

ELWIN D. BARNES.